United States Patent [19]

Robertson et al.

[11] Patent Number: 4,601,478
[45] Date of Patent: Jul. 22, 1986

[54] SIMULATED FLYING FIGURE WITH MOVABLE WINGS

[75] Inventors: John C. Robertson, Bloomfield; Paul S. Santarsiero, Avon, both of Conn.

[73] Assignee: Coleco Industries, Inc., West Hartford, Conn.

[21] Appl. No.: 703,306

[22] Filed: Feb. 20, 1985

[51] Int. Cl.⁴ .................................................. B62J 39/00
[52] U.S. Cl. .............................. 280/1.13; 280/289 R; 280/289 H; 446/365
[58] Field of Search ................ 280/1.13, 1.1 R, 1.1 A, 280/1.11 R, 1.12, 1.165, 1.201, 1.21, 1.22, 289 H, 289 D, 289 R; 446/330, 359, 365; 403/361, 380; D3/1, 4

[56] References Cited

U.S. PATENT DOCUMENTS

| | | | |
|---|---|---|---|
| 2,036,328 | 4/1936 | Furey | 446/269 |
| 2,637,939 | 5/1953 | Polk | 446/365 |
| 3,153,871 | 10/1964 | Semba | 446/337 |
| 3,577,670 | 5/1971 | Gutierrez | 446/365 |
| 4,244,138 | 1/1981 | Holahan et al. | 446/365 |
| 4,307,533 | 12/1981 | Sims et al. | 446/365 |

OTHER PUBLICATIONS

1948 Toys Catalogue of Coleco Industries, Inc.–p. 48.

*Primary Examiner*—John A. Pekar

[57] ABSTRACT

A simulated flying-figure unit is adapted for mounting upon the handlebar structure of a child's ride-on toy, and permits the child to operate a push-button lever to simulate flapping wings while riding the vehicle. The construction of the unit disposes the operating button in convenient position, and achieves a desirable mechanical advantage, for facile actuation. The wing assembly used is readily disengageable from the unit, and yet is constructed to afford durability and secure mounting.

19 Claims, 5 Drawing Figures

SIMULATED FLYING FIGURE WITH MOVABLE WINGS

BACKGROUND OF THE INVENTION

Ride-on toys in the form of low-slung tricycles currently enjoy widespread popularity. They are generally decorated in ways that are attractive and often unique, and it is not uncommon to add various kinds of units to promote a thematic concept or to otherwise increase the level of interest and enjoyment for the child. For example, a head-simulating figure may be mounted upon the handlebar structure of such a cycle, to cooperate with a creature body-simulating design of the vehicle chassis.

In addition, toys capable of animation have long found widespread appeal among children, and are disclosed in numerous forms in the prior art. One form of such action toys simulates a creature having wings that are movable in a flapping action, as disclosed in the following U.S. Pat. Nos. 2,036,328 to Furey; 2,637,939 to Polk; 3,153,871 to Semba; 3,577,670 to Gutierrez; 4,244,138 to Holahan et al; and 4,307,533 to Sims et al.

More particularly, the Furey patent describes a toy insect having movable wings that are operatively connected to a pair of ground-engaging wheels.

A flapping wing toy, constructed to simulate a bird or butterfly, is shown in the Polk patent; it employs a pair of hinged arms, oscillated by finger pressure, to which the wing sections are attached.

Semba shows the use of an electric motor to animate various parts of a bird toy, including the wings; projections on a rotated disc successively engage a rod to which the wings are attached, oscillating the rod and thereby causing a fluttering effect of the wings.

Gutierrez discloses a wing flapping toy in which the wings are loosely mounted upon a handle, and are held in place by a rubber band. The handle has a spring-like portion which terminates in a pair of parallel ears, disposed to force the wings to elevated positions when the handle is squeezed.

The Holahan et al patent describes an animated bird toy in which a trigger-like lever, pivotably mounted upon the body, is operated to simulate flapping of outwardly extending portions of the wings.

In the toy insect of the Sims et al patent, four wings are rotatably mounted upon pins attached to hinged mounting plates. The plates are acted upon by a lever to elevate the wings against the force of gravity.

It is of course desirable to achieve optimal visual appeal, functional effectiveness, facile operation, and durability in any such add-on unit, while minimizing the complexity of the animating mechanism and the cost of manufacture, and ensuring compatibility with the vehicle. Despite the level of prior art activity indicated above, a demand remains for a figure-simulating unit of unique construction, in which the foregoing criteria are realized.

Accordingly, it is a broad object of the present invention to provide a novel unit for mounting upon handlebar structure of a child's ride-on toy, and a novel ride-on toy incorporating such a unit, wherein the unit is adapted for manual actuation to simulate a flying figure having flappable wings.

It is a more specific object of the invention to provide such a unit in which the actuating mechanism is of relatively uncomplicated and durable construction, is comprised of parts that are relatively simple and few in number, and provides good mechanical advantage and convenience for facile operation.

Another object of the invention is to provide such a unit and toy creature which are relatively economical to manufacture.

An additional object of the invention is to provide a novel wing assembly which is adapted to be readily mounted upon and removed from supporting parts provided by such a unit, the interconnection therebetween being resilient and yet secure.

SUMMARY OF THE INVENTION

It has been now found that certain of the foregoing and related objects of the invention are attained by the provision of a unit adapted for mounting upon handlebar structure of a child's ride-on toy, and by the provision of a ride-on toy incorporating the same, wherein the unit simulates a flying figure with flappable wings. It comprises a housing having an elongated, normally horizontally extended forward portion, and a rearward portion angled downwardly therefrom for mounting upon a forwardly inclined surface of the handlebar structure of the ride-on toy; a pair of support pieces mounted within the forward portion of the housing for movement about longitudinally extending axes on opposite sides thereof; and a generally L-shaped actuating lever for the support pieces, which have end portions lying inwardly of their axes of pivoting and proximate one another for simultaneous contact thereby. Outer end portions of the support pieces are adapted to engage wing members for the support thereof, the housing having lateral openings therein providing access and permitting vertical reciprocation of wing members extending therethrough. One end portion of the actuating lever is pivotably mounted within the rearward portion of the housing for movement about a transversely extending axis, and the other end portion thereof extends forwardly and is disposed for operative engagement with the inner end portions of both of the supporting pieces. The actuating lever is accessible for manual operation externally of the housing, so that a flapping action of wing members supported by the supporting pieces can be simulated by alternate application and release of inward force thereon.

In certain embodiments the forward and rearward portions of the housing will be configured to simulate a creature head and neck, respectively, with the support pieces being mounted in lateral alignment just forwardly of the juncture between the housing portions. Generally, the actuating lever will be substantially fully enclosed within the housing, and will have a button portion intermediate the end portions thereof normally protruding through an opening in the upper wall of the rearward housing portion, to afford external access to the lever. More specifically, the lever may comprise a relatively short leg and a relatively long leg, and may be mounted at the free end of the shorter leg with the longer leg lying over the support pieces and in contact along the inner margins thereof. The button portion will desirably be disposed at the juncture between the legs, and at least the portion of the longer leg that overlies the support pieces will advantageously be of relatively wide, inverted U-shaped cross section; this will cause the inner edges of the support pieces to traverse the lower edges of the overlying part, to contact the support pieces outwardly of their inner edges.

Preferably, the support pieces will comprise sleeves of generally tubular construction, with axle elements disposed adjacent their outer ends. The passages through the sleeves will desirably be of relatively low and wide transverse cross-sectional configuration and will provide the wing member-engaging means, with the actuating lever contacting the inner end portions thereof directly.

Most desirably, the unit will additionally include a wing member disengageably mounted upon each of the sleeves, which will have an inner end portion of reduced lateral dimensions, relative to its outer end portion, inserted into the passages thereof. The wing member will normally be fabricated from a semirigid material, and will beneficially have a piece of relatively soft and resilient material affixed on its inner end portion to enhance the level of frictional interengagement with the sleeve. Most advantageously, the friction material will be in the form of a band about the wing member, and will be of sufficient thickness to provide a cushioning effect for protection against damage due to stress and impact. Both the inner end portion of the wing member and also the friction band will beneficially be formed with longitudinally extending corrugations (those of the band being on the top side), and the sleeve passages, the end portions of the wing members, and the friction band will advantageously all be of arcuate transverse cross section. Normally, the unit will additionally include means for upwardly biasing the inner end portions of the wing support pieces, which means may take the form of a pair of leaf spring elements underlying the support pieces and bearing upwardly upon the inner end portions thereof.

Other objects of the invention are attained by the provision of an artificial wing assembly which is adapted for disengageable mounting upon a part defining a socket for the receipt thereof. The assembly will employ a wing member and a friction band, both as described above and hereinbelow.

DETAILED DESCRIPTION OF THE ILLUSTRATED EMBODIMENTS

Figure 1:
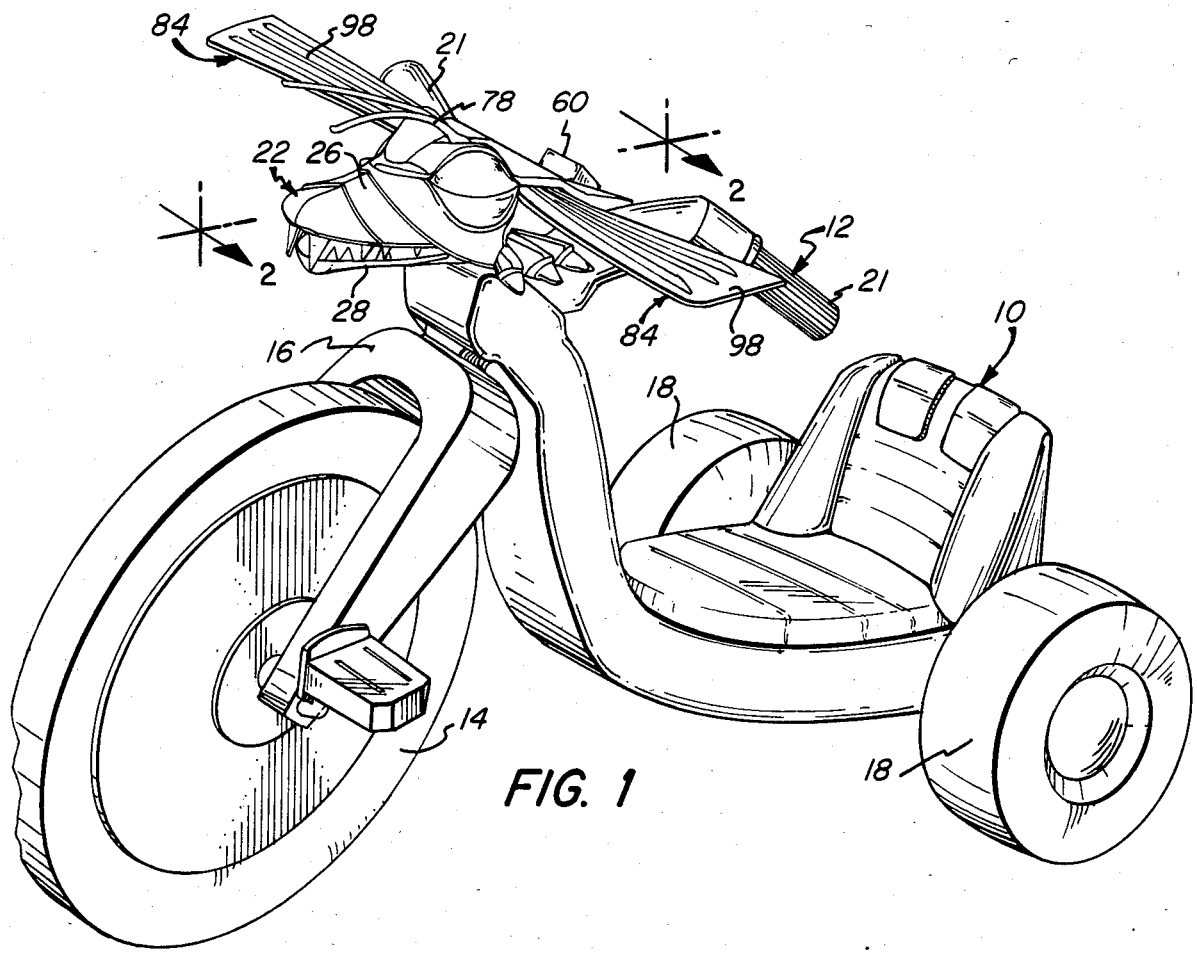
FIG. 1 is a perspective view of a simulated flying figure unit, mounted upon a child's ride-on cycle toy, embodying the present invention.
Figure 2:
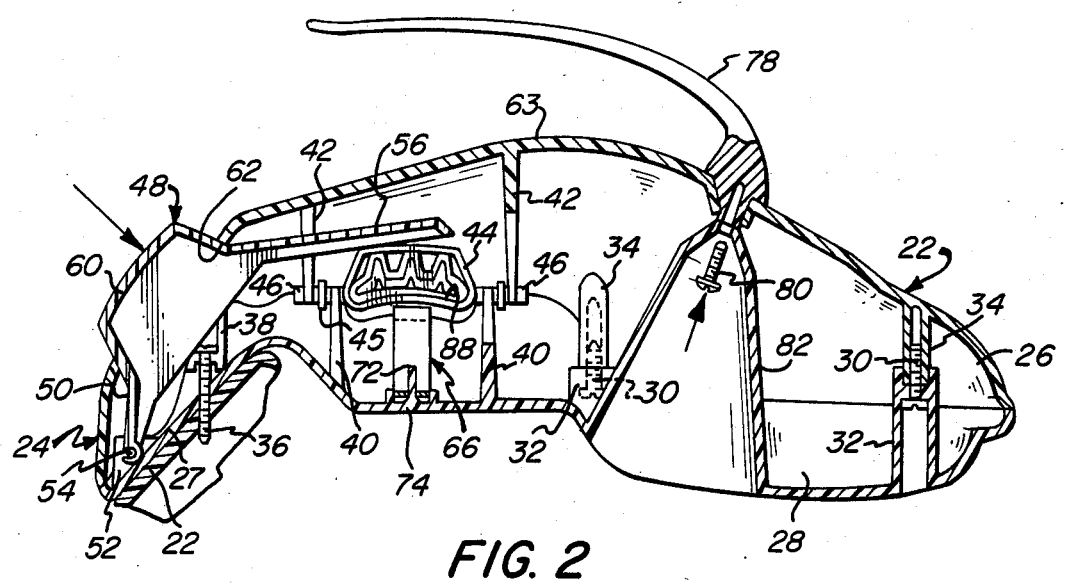
FIG. 2 is a vertical sectional view of the figure-simulating unit of FIG. 1, taken along line 2—2 thereof and drawn to a greatly enlarged scale.

FIG. 1 of the appended drawings illustrates a child's ride-on toy cycle embodying the present invention, consisting of a body or chassis structure and a handlebar structure, generally designated by the numerals 10 and 12, respectively. A large wheel 14 with attached pedals is journaled within the fork 16 of the handlebar structure 12, for steering and pedaling of the cycle, and the chassis structure 10 is supported upon rear wheels 18. A simulated flying figure unit is mounted upon the handlebar structure 12.

Turning now more particularly to FIGS. 2-5, it can be seen that the figure-simulating unit comprises a housing provided by upper and lower sections 26, 28, which are secured together by screws 30 engaged within the aligned column and post formations 32, 34 thereof. In general conformation, the figure-simulating unit consists of a head portion, generally designated by the numeral 22, and a neck portion generally designated by the numeral 24. The neck portion 24 declines from the head portion 22 at an angle corresponding to the angle of incline of the panel portion 23 (which is disposed centrally of the handles 21 of the handle structure 12), and it is attached thereto so as to normally dispose the head portion in a forwardly projected, generally horizontal attitude. Screws 36 are received in column formations 38 of the upper housing section 26, and they pass through the inclined wall 27 of the lower housing section 28 and into engagement with the panel portion 23; thus, the screws 38 serve not only to mount the figure unit upon the handle structure 12, but also to cooperate in holding together the housing sections.

A pair of rib elements 40 extend upwardly within the lower housing section 28 on the opposite sides thereof and near the juncture between the head and neck portions; they cooperate with generally aligned pairs of rib elements 42 depending from the upper housing section 26, to pivotably mount a wing-supporting piece. The latter consists of a tubular sleeve 44 having a pair of stub axle elements 46 thereon, which are positioned near the outer ends of the sleeves for optimal leverage and mechanical advantage. The axle elements 46 are held in place between the ends of the rib elements 40, 42, which are suitably recessed at 43 to accommodate them, and small collars 45 on the axle elements help to maintain proper positioning.

Figure 5:
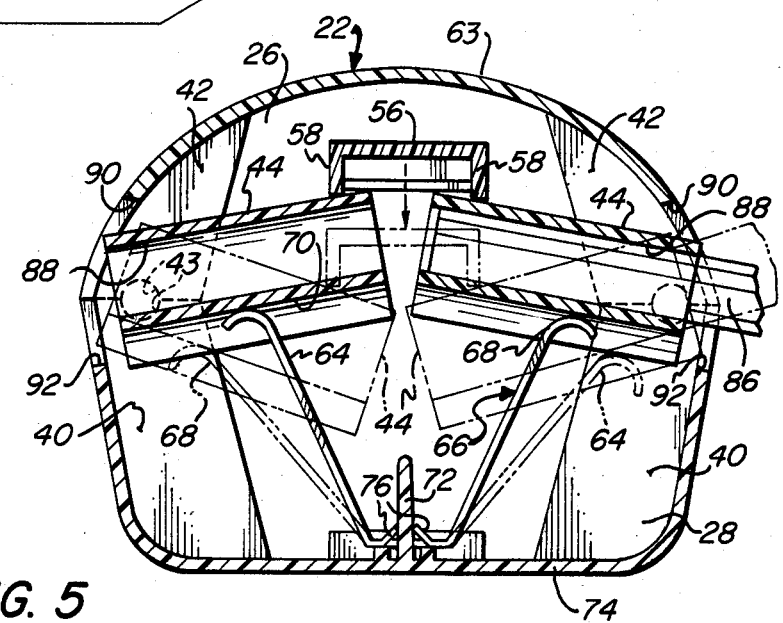
FIG. 5 is a fragmentary sectional view of the unit, taken along line 5—5 of FIG. 3 and drawn to a scale enlarged therefrom, the lowered and elevated positions of the wing member supporting sleeves being shown in full and phantom line, respectively.

A roughly L-shaped operating lever, generally designated by the numeral 48, is pivotably mounted within a pair of spaced, upstanding bracket pieces 52 formed in the neck portion of the lower housing section 28, the shorter leg portion 50 of lever 48 having a shaft 54 extending transversely therein for that purpose. The longer leg portion 56 extends forwardly over the two wing-supporting sleeves 44, and (as best seen in FIG. 5) has a squared, inverted U-shaped cross-sectional configuration, the lateral flange elements 58 of which bear upon the sleeves 44 at locations spaced a short distance from their inner ends. A button portion 60 is formed at the juncture between the legs 50, 56 of the operating lever 48, which normally protrudes through the opening 62 formed in the upper wall 63 within the neck portion 24 of the housing.

The wing-supporting sleeves 44 are biased upwardly by the elements 64 of a U-shaped leaf spring 66, the end portions 68 of which are curved to slidingly bear upon the arcuate bottom surfaces 70 of the sleeves. The spring 66 is mounted upon a post 72 which projects upwardly from the bottom wall 74 of the housing section 28, the connecting portion of the leaf spring 66 being stamped to form inwardly inclined gripping fingers 74, which engage the sides of the post 72 inserted upwardly therethrough so as to fix the spring in place. An antenna structure 78 is mounted in the forehead area of the upper wall 63, and is secured in place by screw 80; the screw passes through the end of wall 82, which defines a deep recess in the lower housing section 28, and thereby also helps to hold the housing sections in assembly.

Figure 3:
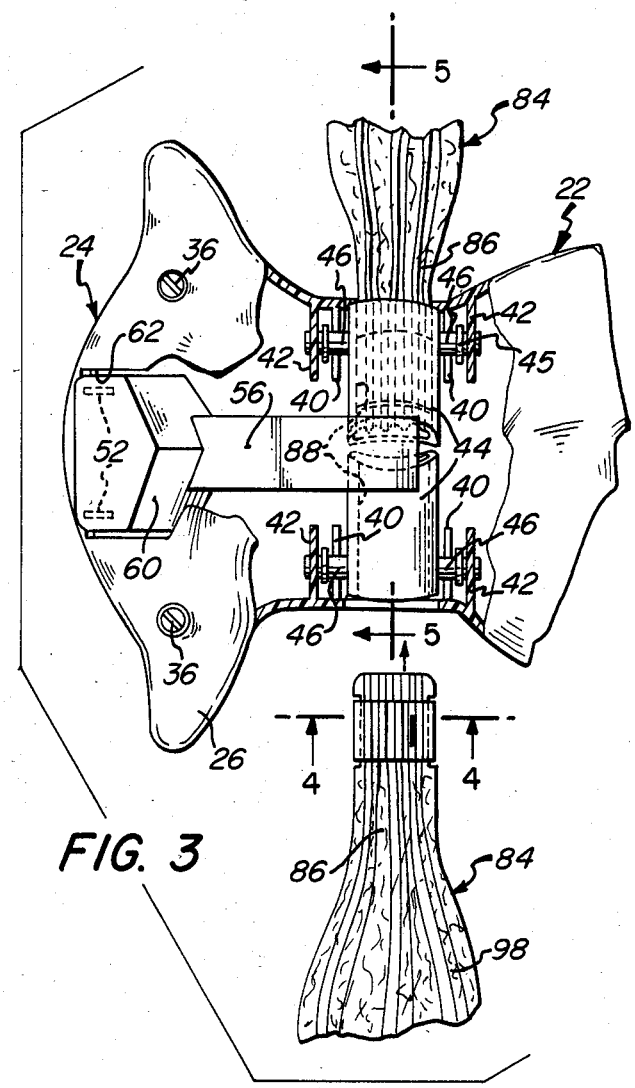
FIG. 3 is a fragmentary plan view, in partial section, of the unit of the foregoing figures, with one of the wing member assemblies withdrawn from the socket of the supporting piece.

As is be best be seen in FIG. 3, a wing assembly, generally designated by the numeral 84, is mounted upon each side of the figure-simulating units by insertion of the inner end portion 86 of the wing member into the passageway 88 through the associated tubular supporting sleeve 44. The housing sections 26, 28 are provided with cooperating slot portions 90, 92, respectively, to permit insertion and vertical reciprocation of the wing assemblies 84. A band 94 of relatively soft and resilient material encircles the inner end portion 86 of the wing member, and is held in place by a wire staple 96.

Figure 4:
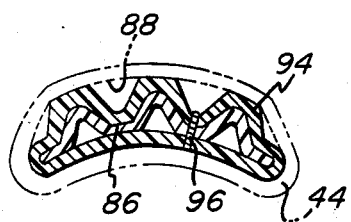
FIG. 4 is a sectional view of the wing member assembly, taken along line 4—4 of FIG. 3 and drawn to a greatly enlarged scale.

The inner end wing portion 86 and the band 94 are both formed with a generally arcuate curvature, conforming to that of the supporting sleeve passageway 88, and have longitudinally extending corrugations molded into them; these features are best seen in FIG. 4, and serve to provide a strong and secure temporary interengagement with the supporting sleeves 44. The resilient band 94 serves not only to provide an enhanced level of frictional engagement upon the inside surface defining the passageway 88, but it also cushions the wing member so as to reduce the likelihood of fracture or other damage at the point of support, where maximum stress is developed.

The manner of operation to simulate flapping action of the wing members will be apparent, and simply involves the application of force upon the protruding button portion 60 of the actuating lever 48, which is conveniently positioned between the handles 21 of the handlebar structure 12 for that purpose. This will cause the lever to pivot about the axle 54, in turn forcing the inner end portions of the supporting sleeves 44 downwardly against the bias of the spring elements 64, and thereby elevating the outwardly extending portions 98 of the wing members. Release of force upon the button portion 60 will of course permit the spring elements 64 to pivot the supporting sleeves 44 to an upward orientation of their inner end portions, thereby returning the wing members to their normal lowered positions. Reciprocation of the lever 48 in this manner will of course simulate a flapping action of the wing members.

Although various materials of construction can be employed for the parts of the figure-simulating unit and the cycle, as will be evident to those skilled in the art, most of them will desirably be made of molded plastics, typically a polyolefin, a polyvinyl chloride resin, an acrylonitrile/butadiene/styrene type copolymer, etc. The wing members will also normally be fabricated from a synthetic resinous material, which may be in the form of a laminated sheet (typically about ten mils in thickness) of acetate or vinyl plastic, preferably constructed or treated to provide an iridescent or similar optical effect. A material particularly preferred for use in fabricating the wing of the creature is the proprietary PVC laminate commercially available from the Coburn Corporation, of Lakewood, New Jersey, under the trade designation DIFRACTO-LIGHT; the friction band will preferably be made of rubbery PVC.

Thus, it can be seen that the present invention provides a novel unit for mounting upon handlebar structure of a child's ride-on toy, and a novel ride-on toy incorporating such a unit, which unit can be operated manually to simulate a flying figure having flappable wings. The actuating mechanism of the unit is of relatively uncomplicated and durable construction, is comprised of parts that are relatively simple and few in number, provides good mechanical advantage and convenience for facile operation, and is relatively economical to manufacture. The invention also provides a novel wing assembly adapted for secure disengageable mounting by supporting parts of such a figure-simulating unit.

Having thus described the invention, what is claimed is:

1. A unit adapted for mounting upon handlebar structure of a child's ride-on toy, for simulating a flying figure with flapping wings, comprising:

a housing having a normally horizontally extended forward portion, and a rearward portion angled downwardly therefrom for mounting upon an inclined surface of the handlebar structure;

a pair of support pieces pivotably mounted within said forward portion of said housing for movement about longitudinally extending axes on opposite sides thereof, said support pieces having inner end portions lying inwardly of the axes of pivoting and proximate one another for simultaneous contact by a common actuating lever, and having outer end portions adapted to engage wing members for the support thereof, said housing having lateral openings therein providing access to said support pieces and permitting vertical reciprocation of wing members extending therethrough; and a generally L-shaped actuating lever having one end portion pivotably mounted within said rearward portion of said housing for movement about a transversely extending axis, and the other end portion extending forwardly therefrom and disposed for simultaneous operative engagement with said inner end portions of both of said supporting pieces, said actuating lever being substantially fully enclosed within said housing but having a portion accessible for manual operation externally thereof, whereby a flapping action of wing members supported by said supporting pieces can be simulated by alternate application and release of inward force upon said actuating lever.

2. The unit of claim 1 wherein said forward and rearward portions of said housing are configured to simulate a creature head and neck, respectively, and wherein said support pieces are mounted in lateral alignment just forwardly of the juncture between said housing portions.

3. The unit of claim 1 wherein said actuating lever has a button portion intermediate said end portions thereof, and wherein an upper wall of said rearward housing portion has an opening therein through which said button portion normally protrudes to afford such access to said lever, said lever being otherwise fully enclosed within said housing.

4. The unit of claim 3 wherein said lever comprises a relatively short leg providing said one portion and a relatively long leg providing said other portion thereof, said lever being mounted at the free end of said short leg with said long leg lying over said support pieces and in contact along the inner margins thereof.

5. The unit of claim 4 wherein said button portion is disposed at the juncture between said legs, and wherein, at least in the part overlying said support pieces, said long leg is of relatively wide, inverted U-shaped cross section, the inner edges of said support pieces traversing the lower edges of said overlying part so that said lower edges contact said support pieces at a distance sapced from said inner edges thereof.

6. The unit of claim 1 additionally including means upwardly biasing said inner end portions of said support pieces.

7. The unit of claim 6 wherein said biasing means comprises a pair of leaf spring elements underlying said support pieces and bearing upwardly upon said inner end portions thereof.

8. A unit adapted for mounting upon handlebar structure of a child's ride-on toy, for simulating a flying figure with flapping wings, comprising:

a housing having a normally horizontally extended forward portion, and a rearward portion angled downwardly therefrom for mounting upon an inclined surface of the handlebar structure;

a pair of support pieces pivotably mounted within said forward portion of said housing for movement about longitudinally extending axes on opposite sides thereof, said support pieces having inner end portions lying inwardly of the axes of pivoting and proximate one another for simultaneous contact by a common actuating lever, and having outer end portions adapted to engage wing members for the support thereof, said housing having lateral openings therein providing access to said support pieces and permitting vertical reciprocation of wing members extending therethrough; and a generally L-shaped actuating lever having one end portion pivotably mounted within said rearward portion of said housing for movement about a transversely extending axis, and the other end portion extending forwardly therefrom and disposed for simultaneous operative engagement with said inner end portions of both of said supporting pieces, said actuating lever being accessible for manual operation externally of said housing, said support pieces comprising sleeves of generally tubular construction having axle elements disposed adjacent the outer ends thereof, the passages through said sleeves providing said wing member-engaging means, and said other end portion of said actuating lever directly contacting the inner end portions of said sleeves, whereby a flapping action of wing members supported by said supporting pieces can be simulated by alternate application and release of inward force upon said actuating lever.

9. The unit of claim 8 wherein said sleeve passages are relatively low and wide in transverse cross-sectional configuration.

10. The unit of claim 9 additionally including a wing member disengageably mounted upon each of said sleeves, said wing member having an inner end portion of reduced lateral dimensions, relative to the outer end portion thereof, inserted into said passage of said sleeve associated therewith.

11. The unit of claim 10 wherein said wing member is fabricated from a sheet of semirigid material, and wherein a piece of relatively soft and resilient material is affixed on said inner end portion to enhance the level of frictional engagement of said wing member with said sleeve.

12. The unit of claim 11 wherein said piece of material is in the form of a band about said wing member inner end portion, said material of said band being of sufficient thickness to provide a cushioning effect to protect said wing member against damage due to stress and impact.

13. The unit of claim 12 wherein said inner end portion of said wing member has longitudinally extending corrugations formed therein, and wherein one side of said band is formed with corresponding corrugations conforming thereto and interfit therewith.

14. The unit of claim 13 wherein said passages through said sleeves are of arcuate transverse cross section, and wherein said end portion of said wing member and said band are of corresponding arcuate transverse cross section to conform thereto.

15. The unit of claim 14 wherein said corrugations are formed in the top side of said band.

16. In a child's ride-on toy, the combination comprising a toy vehicle having a seat portion and a handlebar structure forwardly thereof, and a flying figure-simulating unit, said vehicle having a forwardly inclined mounting surface on said handlebar structure on which said figure-simulating unit is mounted, and said figure-simulating unit including:

a housing having an elongated, forward portion and a rearward portion angled downwardly therefrom, said rearward portion being affixed to said inclined surface of said handlebar structure to normally dispose said forward portion in a substantially horizontal attitude;

a pair of support pieces pivotably mounted within said forward portion of said housing for movement about longitudinally extending axes on opposite sides thereof, said support pieces having inner end portions lying inwardly of the axes of pivoting and proximate one another for simultaneous contact by a common actuating lever, and having outer end portions adapted to engage wing members for the support thereof, said housing having lateral openings therein providing access to said support pieces and permitting vertical reciprocation of wing members extending therethrough; and a generally L-shaped actuating lever substantially fully enclosed within said housing and having one end portion pivotably mounted within said rearward portion thereof for movement about a transversely extending axis, and the other end portion extending forwardly therefrom and disposed for simultaneous operative engagment with said inner end portions of both of said supporting pieces, said actuating lever having a portion that is accessible at a convenient location on said handlebar structure for manual operation externally of said housing, whereby a flapping action of wing members supported by said supporting pieces can be simulated by alternate application and release of inward force upon said actuating lever.

17. The unit of claim 16 wherein said actuating lever has a button portion intermediate said end portions thereof, and wherein an upper wall of said rearward housing portion has an opening therein through which said button portion normally protrudes to afford such access to said lever.

18. An artificial wing assembly adapted for disengageable mounting by a part defining a socket for the receipt thereof, said assembly comprising a wing member fabricated from a semirigid material and having an inner end portion of reduced lateral dimensions, relative to the outer end portion thereof, and a band of relatively soft and resilient material extending about said inner end portion of said wing member and affixed thereto, said inner end portion of said wing member and said band having interfitting longitudinally extending corrugations formed therein, said band serving to enhance the level of frictional engagement of said wing member within the socket of the mounting part, and said material thereof being of sufficient thickness to provide a cushioning effect to protect said wing member against damage from stress and impact.

19. The unit of claim 18 wherein said end portion of said wing member and said band are of arcuate transverse cross section, and wherein said corrugations extend along the convex side of said band.

* * * * *